United States Patent [19]

Meyer

[11] Patent Number: 4,522,152
[45] Date of Patent: Jun. 11, 1985

[54] ANIMAL FEEDER

[76] Inventor: James R. Meyer, Rte. 3, Box 267, Warrenton, Mo. 63383

[21] Appl. No.: 583,109

[22] Filed: Feb. 24, 1984

Related U.S. Application Data

[63] Continuation-in-part of Ser. No. 406,303, Aug. 9, 1982, abandoned.

[51] Int. Cl.³ .................................................. A01K 5/00
[52] U.S. Cl. .................................. 119/56 R; 119/52 R
[58] Field of Search .................... 119/51 R, 52 R, 53, 119/53.5, 54, 56 R, 60, 61

[56] References Cited

U.S. PATENT DOCUMENTS

| | | | |
|---|---|---|---|
| 1,212,937 | 1/1917 | Good | 119/53.5 |
| 1,810,230 | 6/1931 | Thumann | 119/52 R |
| 3,498,311 | 3/1970 | Hawes, Jr. | 119/52 R |
| 3,565,563 | 2/1971 | Radach | 119/56 R |
| 4,050,415 | 9/1977 | Conger | 119/51.5 |

Primary Examiner—Hugh R. Chamblee
Attorney, Agent, or Firm—Glenn K. Robbins

[57] ABSTRACT

A feeder for pets and other animals. The feeder is comprised of a top feed storage and hopper leading to a metering valve. The valve is of hollow cylindrical construction having an axial slot which acts as a fill opening and when rotated to selected positions acts as a weir where feed can overflow to an underlying weather protected animal feeding compartment. The hopper comprises plates which may be removed for ready filling of the entire feeder for self-feeding purposes. The compartment has a dish shaped bottom and may receive a congruent feed dish in nesting relation.

7 Claims, 11 Drawing Figures

ANIMAL FEEDER

RELATED APPLICATION

This application is a continuation-in-part of my co-pending application Ser. No. 406,303, filed Aug. 9, 1982, abandoned.

BACKGROUND OF THE INVENTION

In the past various forms of animal feeders have been provided. While some feeders have means for dispensing metered amounts of feed to a feed compartment and other different types of feed compartments there has been a need to provide a low cost simply fabricated weatherproof feed apparatus which can dispense feed through a simple low cost metering valve in selected amounts to a protected animal feeding compartment.

SUMMARY OF THE INVENTION

By means of the instant invention there has been provided a pet feeder for dogs and cats or other animals which is portable and may be simply fabricated of sheet metal or other standard material of construction. The feeder is comprised of a sheet metal housing defining a top feed storage compartment, an underlying cylindrical metering valve for metering a selected amount of feed through a sloped baffle to a restricted opening leading to an underlying protected animal feeding compartment at the bottom or floor level.

The housing is portable and may be simply moved to any desired location through handles provided at the side. Loading of feed is effected by a removable top cover.

The animal feeding compartment has a dish shaped end wall construction. This feature aids in cleaning and facilitates the reception of a congruent feed dish which may be efficiently nested in the feeding compartment to further aid in cleaning the feeder.

The metering valve is of a special construction comprising a hollow cylindrical valve having an axial slot which is registrable underneath a hopper-like opening in the feed storage compartment. The valve is rotatable by an exterior handle to cause the feed in the valve to overflow through the opening in a weir-like overflow. By rotating the valve to selected positions in one direction a selected metered amount of feed may be simply and efficiently dispensed while rotation in an opposite direction may be employed for dispensing larger amounts of feed for self-feeding.

In a modification of the feeder the hopper has removable wall plates. When removed the feeder may be readily and completely filled for self-feeding purposes. An entire bag of feed may be emptied into the top of the feeder and charge the lower part of the feed through openings on both sides of the valve provided by the removal of the hopper plates.

Sealing of the feed storage compartment to the metering valve is effected by a restricted vertical passageway having rubber-like flexible walls that wipe or are biased against the metering valve. The walls permit rotation of the cylindrical metering valve while effectively sealing the valve and preventing any flow or loss of the feed.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

DESCRIPTION OF THE INVENTION

The pet or animal feeder of this invention is generally identified by the reference numeral 10. It is comprised of a sheet metal housing 12 and a top cover 14. While sheet metal is the prefered material of construction other rigid materials may be employed that are desirably rodent proof. The housing is of rectangular construction formed by rear wall 16, front wall 18 and side walls 20 and 22. Handles 24 and 26 facilitate carrying the feeder from one location to another.

Within the housing are positioned for gravity feed, a feed storage compartment 28, sealed passageway 30, metering valve 32, baffle feed directing and self-feeding storage area 34 and a bottom feed compartment 36.

Figure 4:
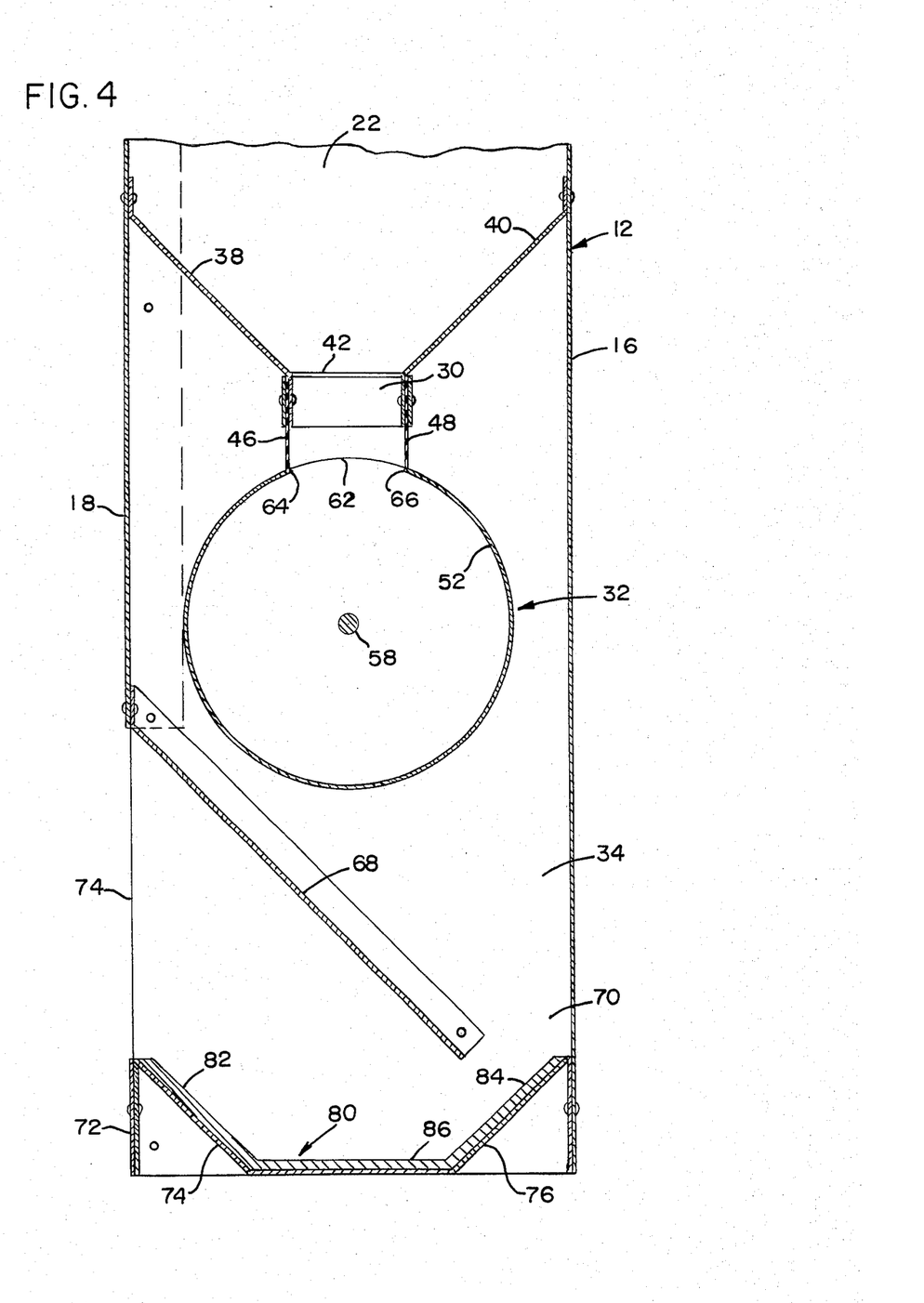
FIG. 4 is an enlarged fragmentary view in vertical section taken on line 4—4 of FIG. 2.

The feed storage compartment as best shown in FIG. 4 is composed of downwardly oppositely sloping walls 38 and 40 which form a hopper having a restricted feed opening 42. A vertical passageway 30 having flexible rubber-like wiper wall elements 46 and 48 at the bottom directs feed from the storage hopper to the metering valve 32. The rubber-like wall elements 46 and 48 are biased against the metering valve and act as a seal to prevent any leakage of feed as the metering valve is rotated as will be more fully described hereinbelow.

Figure 5:
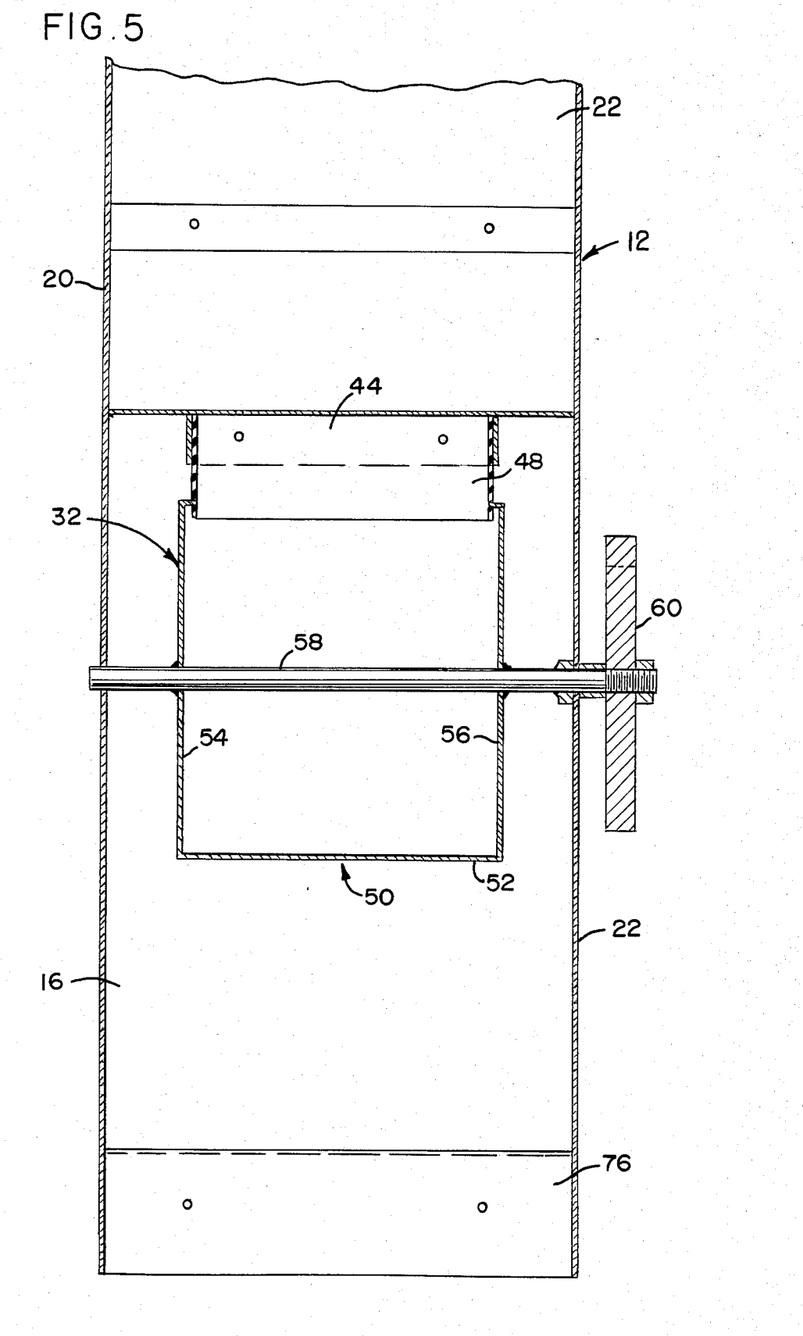
FIG. 5 is an enlarged fragmentary view in vertical section taken on line 5—5 of FIG. 3.

The metering valve 32 is best shown in FIGS. 4 and 5. The valve is formed from a hollow cylindrical housing 50 having a horizontal axis. The housing has a cylindrical wall surface 52 and end walls 54 and 56 which support by weldments or the like a horizontal drive shaft 58. The drive shaft is journalled in the side walls of the housing and is connected at the right end to a handle 60.

A valve slot or opening 62 is provided in the cylindrical wall surface which extends axially along the surface. The slot is defined by the edges 64 and 66 of the slot. These edges act as a weir over which the feed with the valve housing 50 can overflow depending on the direction of the rotation of the valve in the dispensing operation as will be more fully described.

The baffle feed directing and self feeding storage area 34 is best shown in FIG. 4. This area is directly below the metering valve and is bounded by the front, rear and side walls of the housing at the sides and a downwardly directed baffle 68 which is connected at the top to the front wall 18 of the housing. The baffle slopes downwardly toward the rear wall 16 of the housing and is spaced a short distance therefrom to define a feed dispensing opening 70.

The bottom feed compartment 36 is best shown in FIGS. 4 and 5. The compartment is located directly under the baffle 68 and is bounded by the two side walls, and rear walls of the housing and a lower lip portion 72 of the front wall 18 of the housing. An opening 74 in the front wall between the lower lip portion and the upper portion of the front wall provides access to the pet feeding within the feeding compartment. The compartment by the aforementioned construction is protected from the weather and provides security for the pet feeding within the compartment.

The feeding compartment floor is comprised of a dish shaped construction consisting of sloping front wall 74 and sloping rear wall 76 and bottom portion 78. This dish shaped construction facilitates feeding as well as cleaning. The construction further receives a congruent dish 80 having a sloping front wall 82, sloping rear wall 84 and flat bottom 86. The dish may be easily fitted in a nesting relation within the compartment and is a further aid to cleaning.

In the modified feeder of FIGS. 6 through 11 the hopper is provided with removable upper wall plates 90 and 92. Each of these plates is provided with a handle 94 for ready insertion and removal from upwardly flaring lower hopper walls 96 and 98. When the plates are removed openings 100 and 102 are provided on opposite sides of the hopper to facilitate rapid filling of the feeder from the lower feed tray to the top of the housing.

Figure 6:
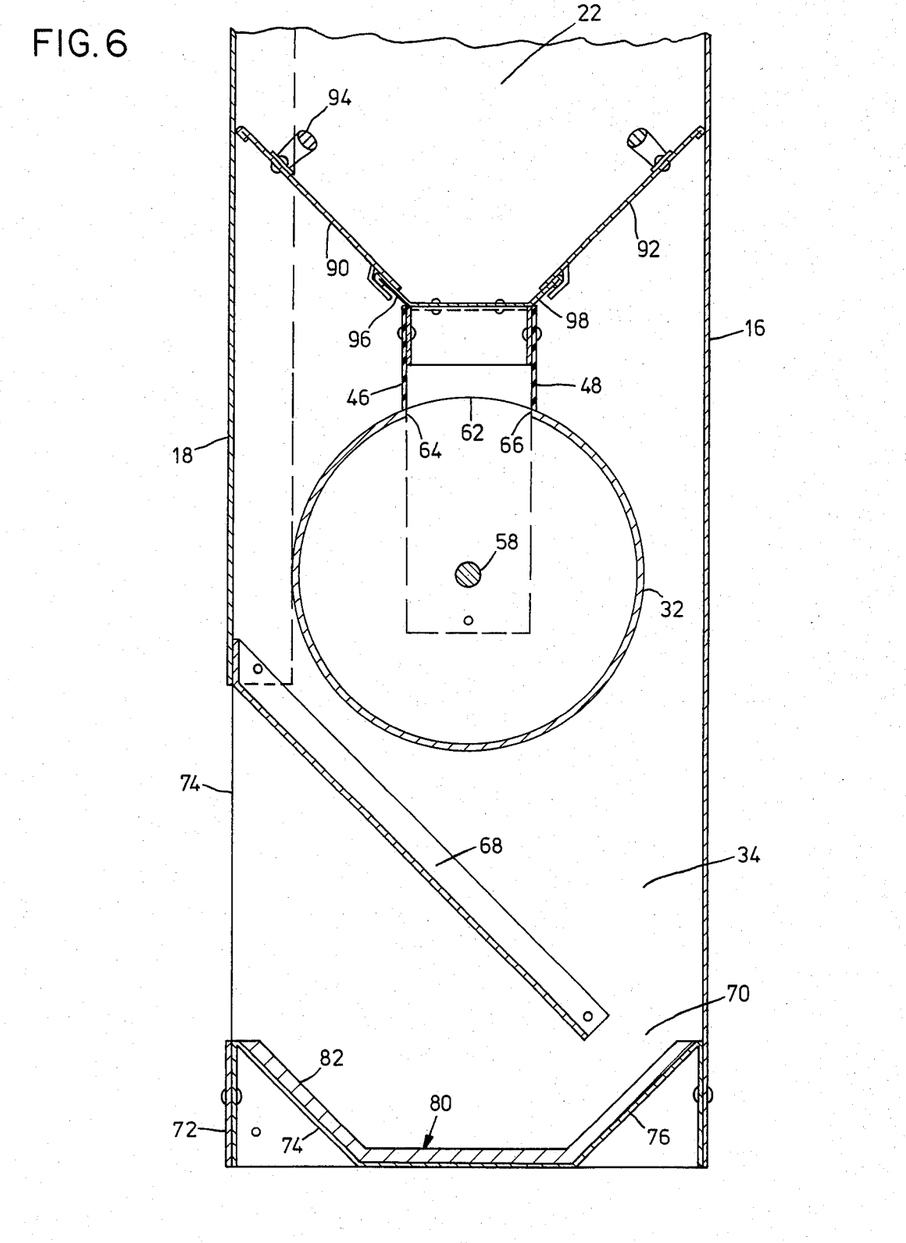
FIG. 6 is a view of a modified self-feeder taken similarly to FIG. 4.
Figure 7:
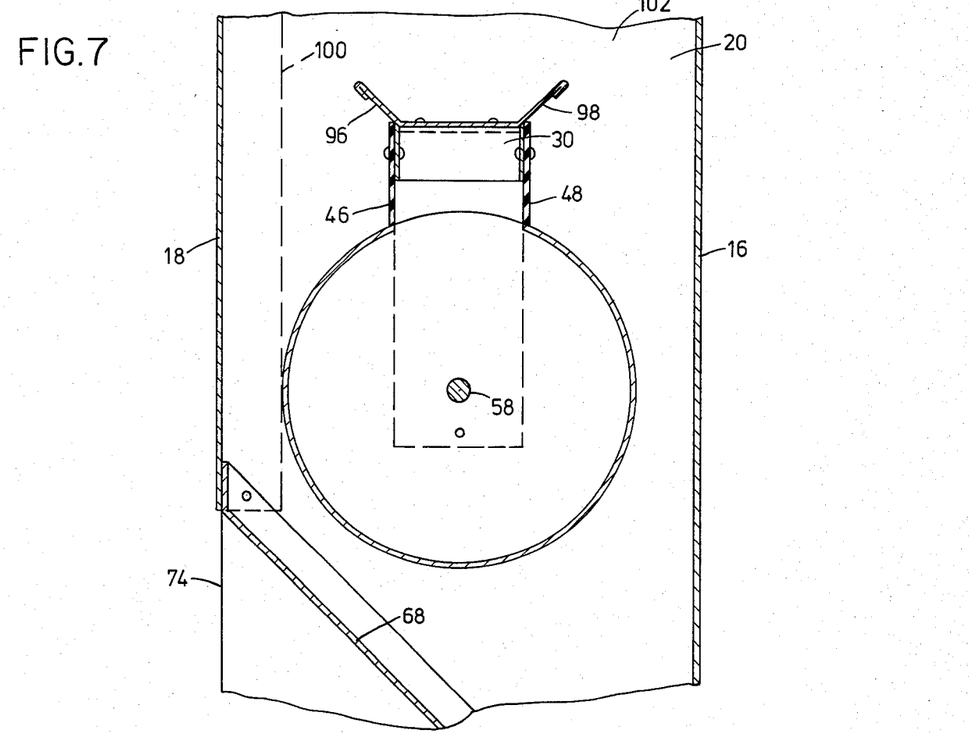
FIG. 7 is a view similar to FIG. 6 with a portion of the hopper removed for ready filling.
Figure 8:
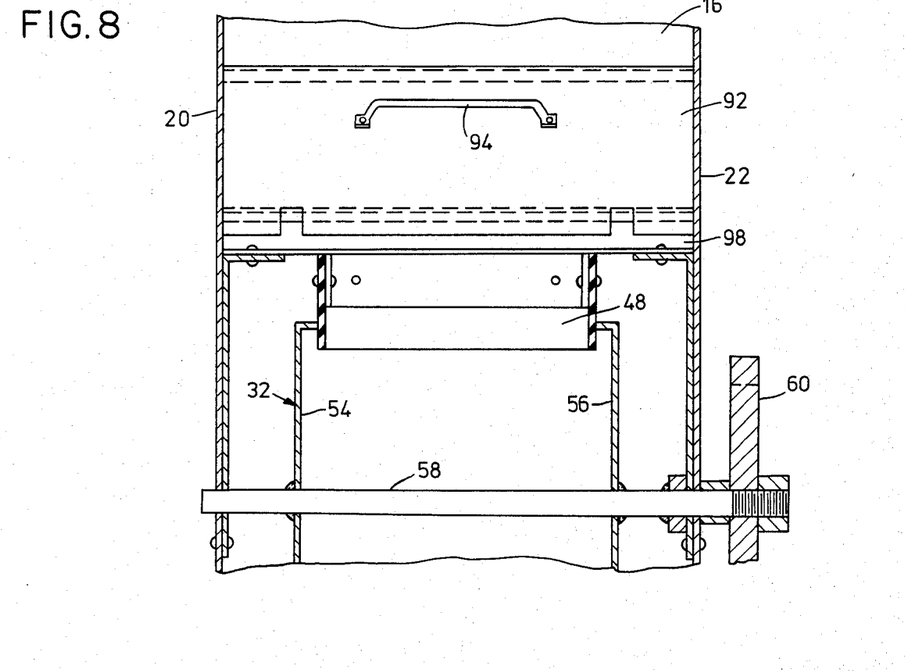
FIG. 8 is a view of the modified self-feeder taken similarly to FIG. 5.
Figure 9:
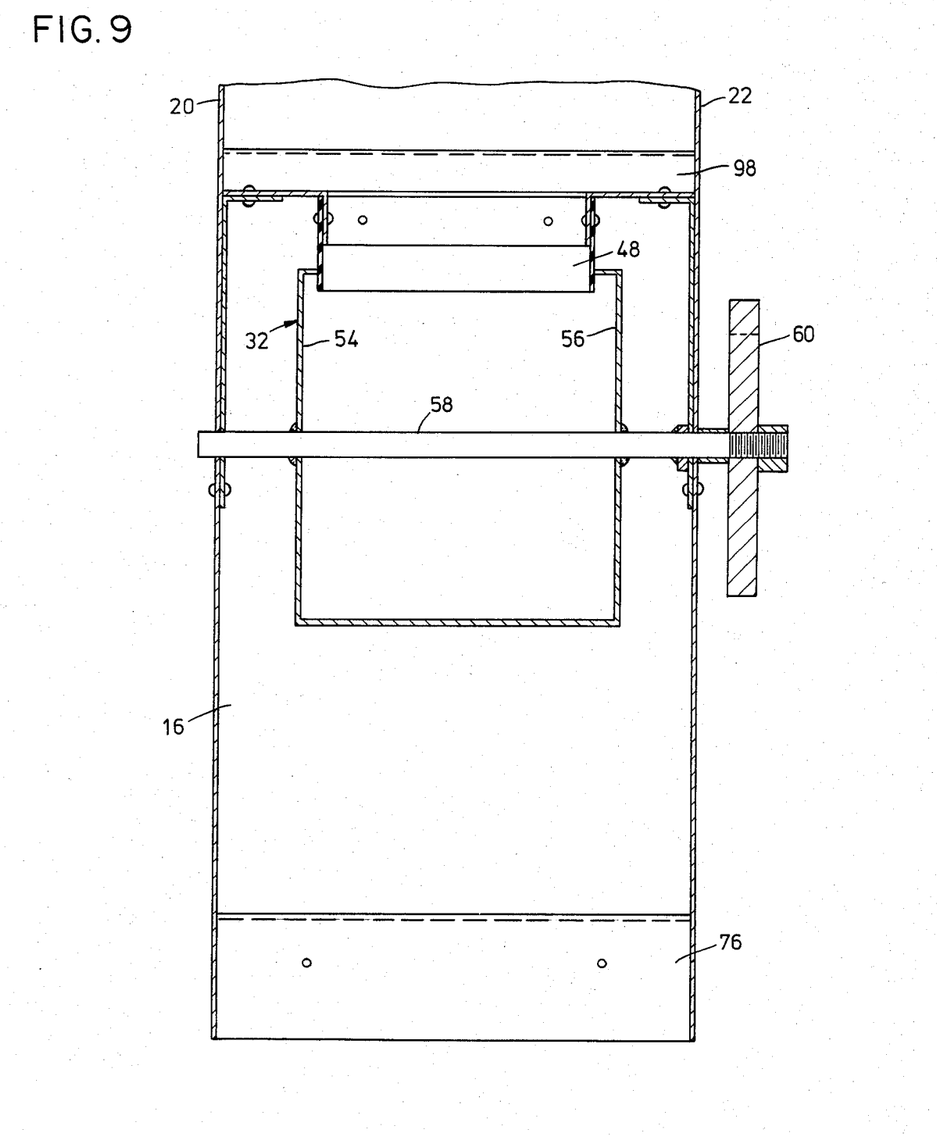
FIG. 9 is a view similar to FIG. 8 with a portion of the hopper removed for ready filling.
Figure 10:
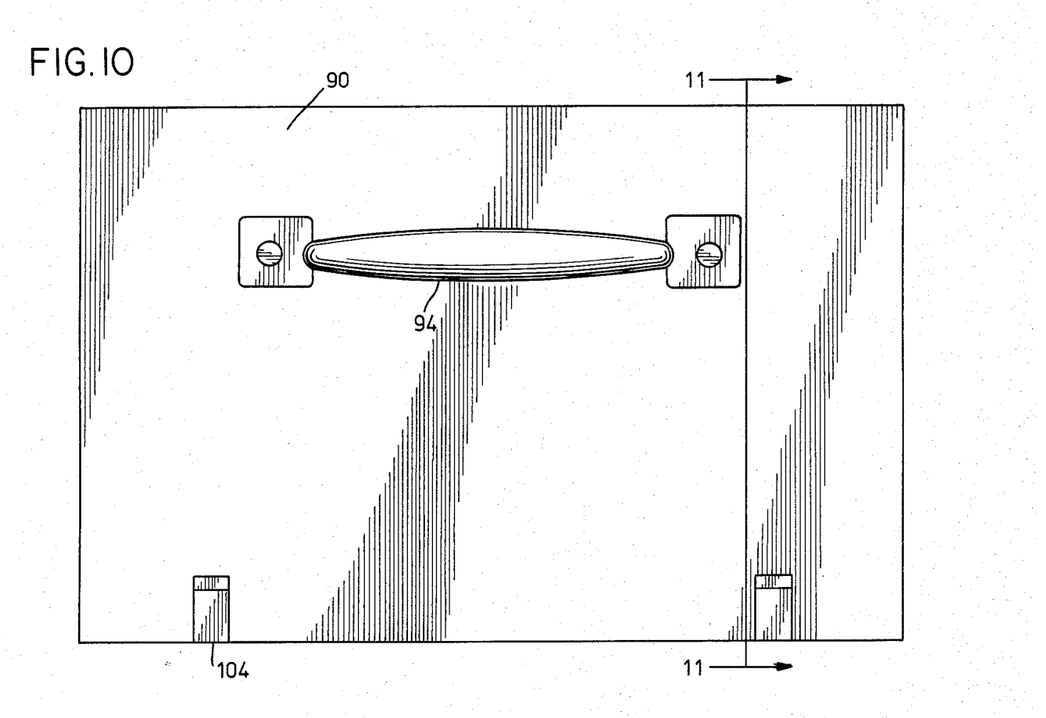
FIG. 10 is a plan view of the removable hopper plate of the modified self-feeder.
Figure 11:
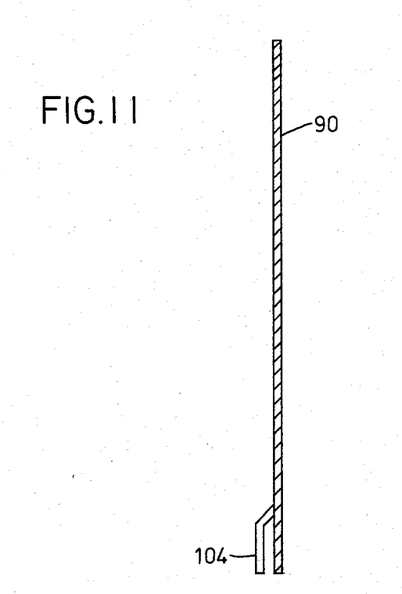
FIG. 11 is a view in section taken on the line 11—11 of FIG. 10.

The plates 90 and 92 each have struck out tabs 104. These tabs as shown in FIGS. 6 and 11 are spaced apart from the main body of the plates to provide a bifurcated structure whereby the plates may be interfitted at the bottom with the top edges of the lower hopper walls 96 and 98. The plates are dimensioned so that their top edges rest against the feeder housing walls 16 and 18 as shown in FIG. 6.

USE

The feeder of this invention is very simply employed. It is readily filled with the valve in the open position by turning the handle 60 to the fill position shown in FIG. 3. In this position the valve slot 62 is in registry with the restricted passageway 44 and the feed storage compartment 28 can be charged with a load of feed. After filling the cover 14 is replaced and the feeder is ready for use and the contents are fully protected from the weather and accessibility from any animals including pests such as rodents.

Figure 1:
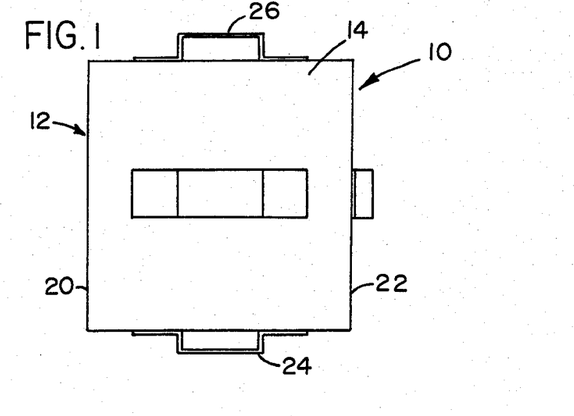
FIG. 1 is a top plan view of the feeder.
Figure 2:
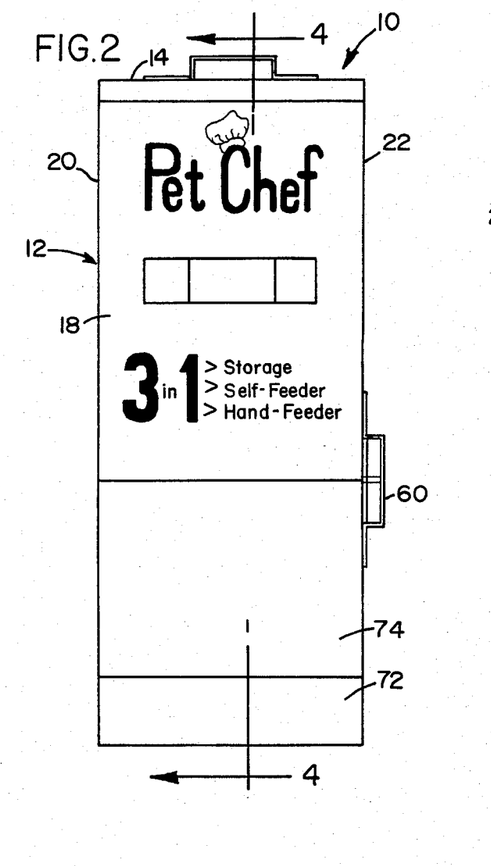
FIG. 2 is a view in front elevation of the feeder.
Figure 3:
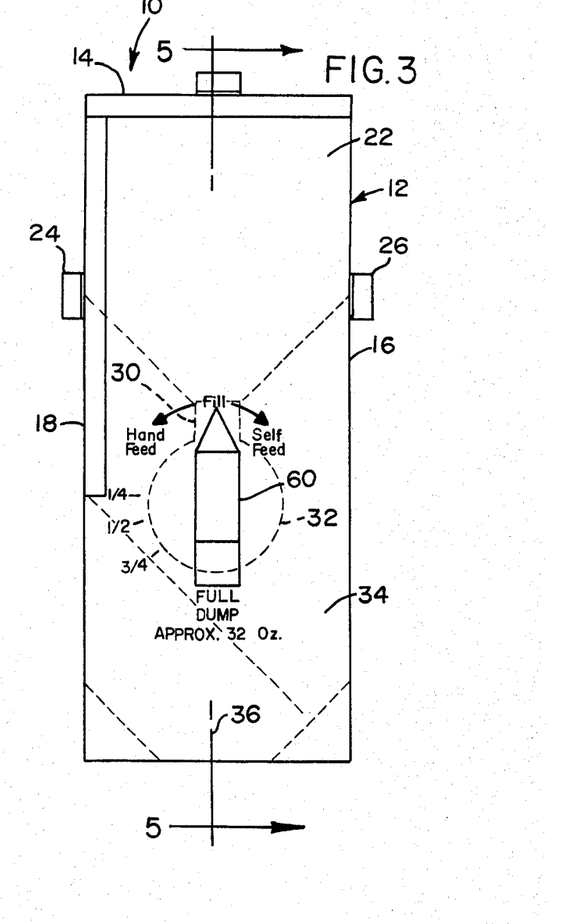
FIG. 3 is a view in side elevation taken from the right side of the feeder.

When it is desired to dispense selected amounts of feed the handle is turned to the selected position such as the "¼" position shown in FIG. 3. In this position the metering valve 33 with a full load in the cylindrical valve housing is rotated counter-clockwise as viewed in FIGS. 3 and 4. This movement is approximately a one-quarter revolution. When the cylindrical housing is rotated the wall edge 64 of the cylindrical housing acts as a weir and one-half the feed contents overflow into the passage between the front wall 18 of the feeder housing and the metering valve onto the baffle 34 and thence through the restricted feed dispensing opening into the feeding compartment 36. The pet or other animal to be fed consumes the metered feed and no more.

Access of the pet to further food in the feeder is prevented by the baffle and the construction of the restricted opening 70 which is positioned well below the metering valve. Further, after dispensing the metering valve may be returned to the fill position where the contents of the valve are completely sealed by the flexible rubber-like seals 46 of the restricted passageway.

Leakage of the feed is prevented by the seals 46 and 48. Thus, these seals not only prevent leakage but also act to direct the feed to the valve opening 62.

Dispensing of the feed for the "¼", "¾" and "Full Dump" positions is carried out in the same manner as aforedescribed. For the "self-feeder" operation repeated cyclic operations in the counter-clockwise direction may be effected with a pause in "Full" position to load the metering valve. The feed directing and self-feeding compartment 34 acts as a reservoir of feed and may be partially filled along with a filling of the bottom of the feeding compartment 36 since the restricted opening acts as a throttle which while permitting filling of the feeding compartment 36 prevents overflow due to the resistance to flow of the discrete solid particles comprising the solid feed which causes back-up and filling of the self-feeding compartment. As feed in the feeding compartment is consumed additional feed can flow through the restricted feed opening 70.

Where desired for the self-feeding operation the handle may be turned clock-wise as viewed in FIG. 3 to effect clock-wise rotation of the metering valve. Somewhat greater feed storage may be effected by this operation since the loading is on the right side of the baffle and the metering valve.

Where self-feeding is desired over a longer period of time the modification of FIGS. 6 through 11 is employed. In this modification the hopper plates 90 and 92 may be simply removed by grasping the handles and removing the plates. The entire feeder may then be filled rapidly and efficiently to the top of the housing. The openings 100 and 102 created by the removal of the upper hopper plates provide access to free flow on both sides of the metering valve in order to fill rapidly the entire feeder or any partial fill as desired. When metered feeding is desired again the bottoms of the plates are simply engaged with the top edges of the lower hopper walls. With this engagement the top portions of the removable plates are then rested against the feeder housing walls and are locked in place by this interfit.

In the feeding of the pet in the feeding compartment the walls 74 and 76 serve to direct the feed to the more accessible central floor area 76. Cleaning is also facilitated due to the elimination of sharp corners. This construction also aids in the throttling function of the restricted feed opening 70 for the self-feeding function.

The aforementioned dish shaped construction of the feeding compartment also serves as a nesting support for the dish 80 which has a congruent configuration. The dish may be inserted as desired and removed for a greater ease in cleaning as required.

Various changes and modifications may be made within this invention as will be apparent to those skilled in the art. Such changes and modifications are within the scope and teaching of this invention as defined by the claims appended hereto.

What is claimed is:

1. A feeder for animals, such as pets and the like, comprising a housing, said housing being comprised of a top feed storage compartment, a pair of downwardly sloping walls defining a V-shaped hopper partition at the bottom of said feed storage compartment, said walls being spaced from one another at the bottom to define a feed opening, a cylindrical metering valve positioned with its axis substantially medially of the front and rear housing walls communicating with said feeder opening for dispensing a selected amount of feed, said cylindrical metering valve being supported upon a shaft rotatably supported by said housing for both clockwise and counterclockwise rotation, said cylindrical metering valve being hollow and having a slot-like arcuate axially extending opening, handle means connected to said shaft for rotating said cylindrical metering valve into and out of registry with said feed opening to fill and dispense feed from the cylindrical metering valve, and a bottom animal feeding compartment in said housing, a feed directing baffle member being provided under said cylindrical metering valve, at a forward portion of the housing and the cylindrical metering valve, said baffle member having a downwardly directed slope toward the rear of the housing and being spaced therefrom to define a baffle dispensing opening to the animal feeding compartment, said cylindrical metering valve being rotatable both clockwise and counterclockwise for self-feeding and metered feeding through a substantially equal self-feeding opening between the cylindrical metering valve and the rear wall and a metered feeding opening between the cylindrical metering valve and the front wall, respectively, said self-feeding operation being effective to fill upon repeated operation an enlarged self-feeding storage area at the rear portion of the cylindrical metering valve and downwardly sloping baffle and extending thereabove from the baffle dispensing opening unimpeded inside the rear housing wall up to the cylindrical metering valve feed discharge, a vertically extending feed passage means connecting said feed opening with said metering valve, said feed passage means being comprised of flexible rubber-like walls at a lower end portion lightly biased against said cylindrical metering valve to provide a sealed relationship, a front wall of the housing having a restricted opening at a bottom portion to provide access to an animal for feeding in the feeding compartment and said baffle extending below said restricted opening and forming a top cover over said compartment and preventing access to the upper portion of the interior of the housing and the housing being provided with restricted feed passage means communicating said metering valve with said animal feeding compartment, said passage means having a bottom opening at the rear of the housing defined by a lower baffle end and a rear wall of the housing, said bottom opening being positioned below said restricted opening to provide a restricted flow of feed to the bottom animal feeding compartment and prevent overflow of solid discrete animal feed in self-feeding.

2. A feeder for animals, such as pets and the like, comprising a housing, said housing being comprised of a top feed storage compartment, a pair of downwardly sloping walls defining a V-shaped hopper at the bottom of said feed storage compartment, said walls being spaced from one another at the bottom do define a feed opening, a cylindrical metering valve communicating with said feed opening for dispensing a selected amount of feed, said cylindrical metering valve being hollow and having a slot-like arcuate axially extending opening, handle means for rotating said cylindrical metering valve into and out of registry with said feed opening to fill and dispense feed from the cyclindrical metering valve, and a bottom animal feeding compartment in said housing, at least one of said downwardly sloping walls comprising a plate-like wall member having means for supporting a lower portion against a fixed lower hopper wall and an upper portion extending in a rest position against an inside wall of the hopper, said fixed lower hopper wall being interiorly spaced from said inside wall of the hopper, said plate-like wall member being removable to expose a passageway from the feed storage compartment at the top of the housing to one side of the cylindrical metering valve to the bottom animal feeding compartment whereby the interior of the housing may be substantially filled for extended self-feeding periods.

3. The feeder of claim 2 in which a handle is provided for said plate-like wall member on a top surface thereto to facilitate insertion and removal from the hopper.

4. The feeder of claim 2 in which the plate-like wall member has a bifurcated engaging means engageable with a top edge of said lower hopper wall.

5. The feeder of claim 4 in which said hopper has a pair of upwardly flaring lower hopper wall members and a pair of said plate-like wall members are engageable therewith to form a continuous V-shaped hopper wall.

6. The feeder of claim 2 in which said cylindrical metering valve is spaced interiorly between opposite walls of said housing and a pair of said plate-like wall members are positioned on opposite sides of the feeder housing directly above opposed passaways between said cylindrical metering valve and opposed side walls of the housing, said passageways communicating with the bottom animal feeding compartment.

7. The feeder of claim 2 in which said hopper has a pair of upwardly flaring lower wall members and said plate-like wall members have a bifurcated engaging means engageable with a top edge of said lower wall members and a handle is provided for each of said plate-like wall members on a top surface thereof to facilitate insertion and removal from the lower wall members of the hopper.

* * * * *